Patented Aug. 17, 1948

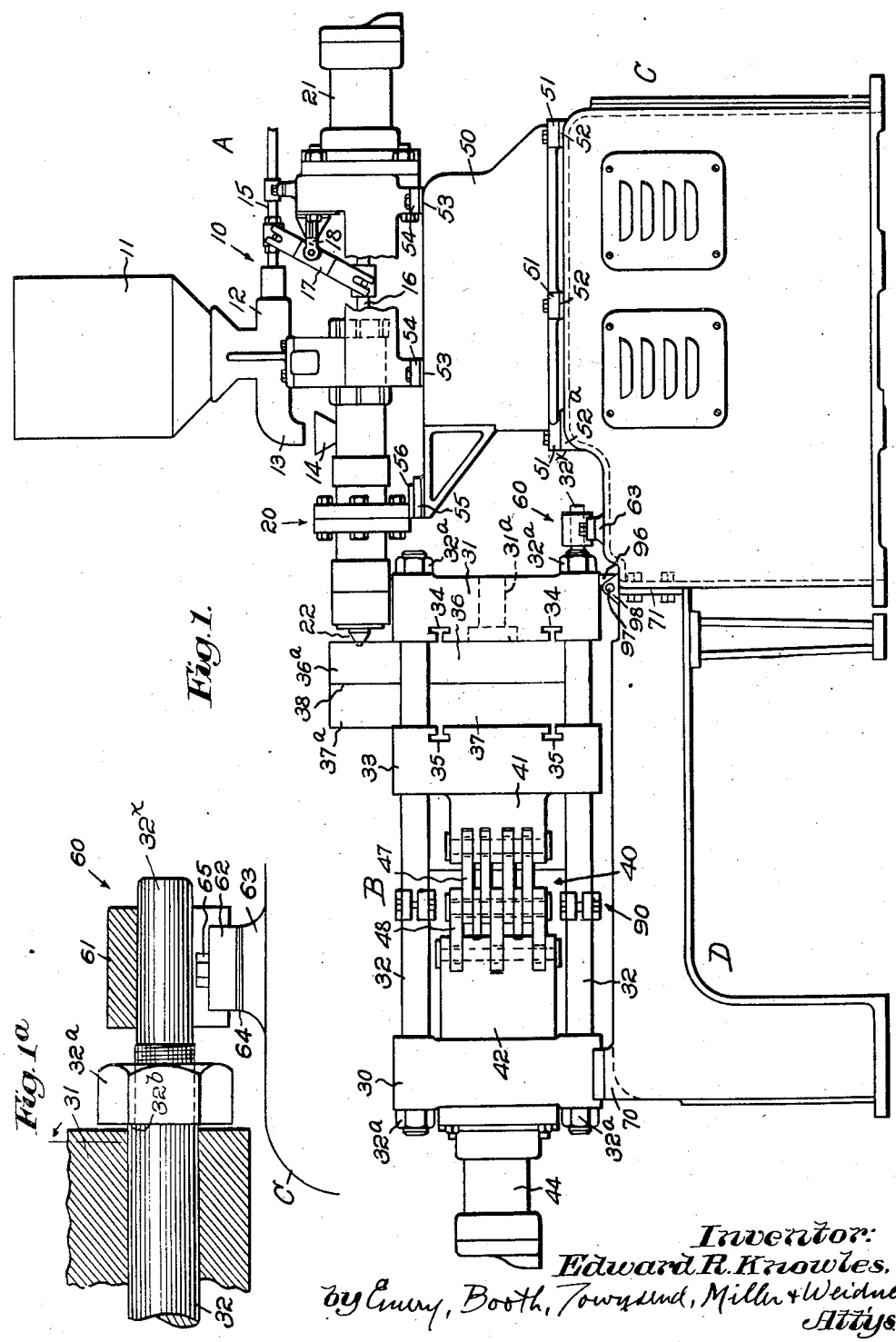

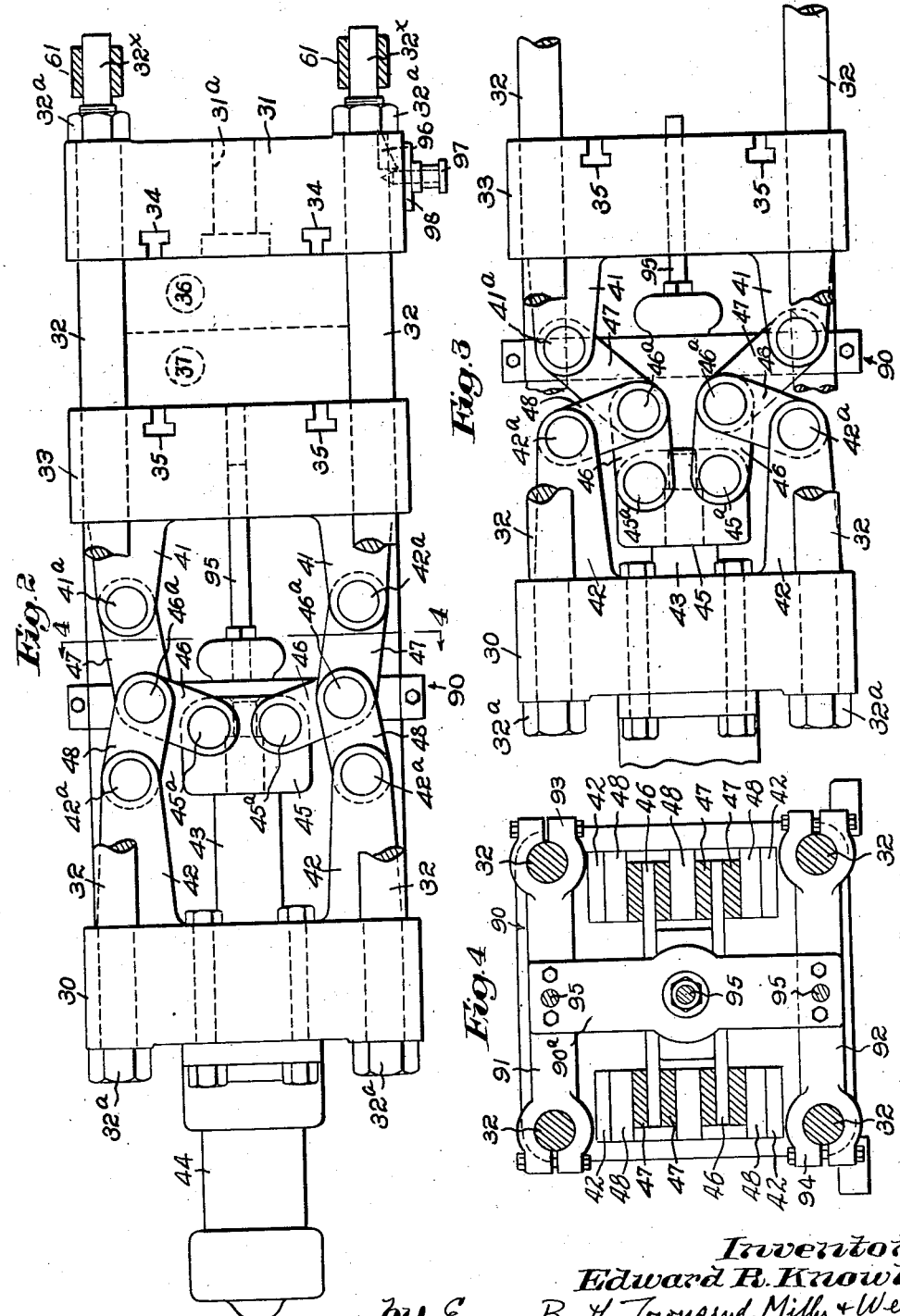

2,447,256

UNITED STATES PATENT OFFICE 2,447,256

PLASTICS MOLDING APPARATUS

Edward R. Knowles, Nashua, N. H.

Original application February 5, 1944, Serial No. 521,171. Divided and this application January 18, 1945, Serial No. 573,335

2 Claims. (Cl. 18—16)

The present invention pertains to molding of plastics and aims to provide improved apparatus and methods for this general purpose. It is concerned more particularly with presses and molding units proper adapted for use with injection and other molding apparatus as well as for compression and other molding methods, and has among its objects to provide novel molding methods and simplified and otherwise improved means of the class described.

This application is a division of my copending application, Serial No. 521,171, filed February 5, 1944.

In the drawings illustrating by way of example one embodiment of the invention and whereby the methods thereof may be practiced:

Fig. 1 is a side elevation of a mold and press unit, shown in one operative installation, in this instance in association with a material injecting unit;

Fig. 1a is a detail view, mainly in longitudinal section and on a larger scale, of a supporting means for the press unit;

Fig. 2 is a top plan of principal parts of a press such as that of Fig. 1, on a somewhat larger scale than in Fig. 1;

Fig. 3 is a view corresponding to the intermediate portion of Fig. 2, with the parts as in an open position of the mold; and Fig. 4 is a cross-section as on the line 4—4 of Fig. 2.

Referring to Fig. 1 the apparatus as there shown comprises a material feed and conditioning assembly or injection unit A, and a molding unit or press B, for hydraulic or other operation. The injection unit A is mounted on a base or frame element indicated generally at C, adapted to house the actuating and control system, the latter preferably hydraulic and either self-contained or associated with an outside or central power source. The molding press B with which this invention is mainly concerned is supported jointly by the frame or housing C and a separable frame element indicated generally at D.

The material conditioning and injection unit may be of any preferred type. As illustrated it comprises a measuring and feeding mechanism indicated generally at 10 and a charging head or cylinder as at 20. The material to be molded, in granular or other form, is supplied from a hopper 11 to a feed chamber 12 for delivery as at the port 13 arranged to present it to an inlet 14 admitting to the conditioning cylinder 20. Measured charges of the material are delivered from the feeding chamber 12 as by the reciprocating feed rod 15. The latter is actuated in proper timed relation, herein through connections with a material charging plunger 16 provided with drive means illustrated as of the hydraulic type, comprising the cylinder 21 having appropriate control valves. A connecting lever 17 is mounted to rock on a fixed part such as the bracket 18 and pivotally connected at its opposite ends with the feed rod 15 and the charging plunger 16 respectively.

Charges of the molding material are thus advanced into the conditioning cylinder 20 and discharged at the nozzle 22 for injection into the mold space. The cylinder 20 desirably includes heating means and torpedo or other means, not necessary to show in detail here, for distributing and guiding the conditioned material to the nozzle.

Considering now the molding unit or press B, this comprises a stationary end plate or head 30 and an opposite end plate and outer-die holder 31. These are connected by a series of parallel rods 32, four of them in the present instance, provided at their respective ends with cap nuts 32a. The end plate 30 is mounted in firmly fixed position on a frame or basal support, herein the frame unit D, as at 70, and is held against movement relative to the rods 32 by anchoring nuts 32a. The end die-holder plate 31 is movably supported on the rods 32, where it is held against outward movement by the adjacent end nuts 32a, which latter are turned up on the reduced threaded ends of the rods, against shoulders thereon, as at 32b, Fig. 1a. As later explained with reference to the operating mechanism, the end or outer die-holder 31 may be arranged for controlled movement inwardly, for breaking contact between the injector nozzle 22 and the receiving orifice for it in the adjacent mold so as to insure interruption of the molding material between said parts.

Also slidably mounted on the bars 32 is the inner die-holder plate 33, adapted for advance toward and opening retraction from the end or outer die plates 31. These outer and inner die plates or mold plates 31, 33 have at their opposed faces slots or like attaching means as at 34, 35 to receive mounting studs or like formations on the removable dies or molds proper 36, 37, the parting line of which is indicated at 38.

The inner holder plate 33 together with its die element is controlled and operated herein through a toggle mechanism designated generally at 40, disposed between and connected with posts or bosses 41 and 42 on said holder plate and on the fixed end plate 30 respectively. Actuation of the toggle mechanism, for advancing, holding closed and retracting the movable die elements is effected as by means of a plunger 43, Figs. 2 to 4, adapted to be driven in the opposite directions by power applying means such as the hydraulic cylinder 44 here shown by way of example.

In the particular assembly of the injection means and the press selected for purposes of illustration, the press is shown arranged for offset or overhead injection. In such instance the dies proper 36, 37 are formed with lateral extensions 36a, 37a into which the sprue, gate, or other passages are extended from the mold cavity or cavities and into communication with an offset or overhead external orifice for seating the nozzle 22 and for entry of the molding material delivered by the latter.

The injection unit A is disposed at the appropriate offset level, as by a demountable table 50 having feet or like attaching formations 51 for reception by corresponding seating formations 52, 52, 52a on the base C. Similarly, at its upper portion the table 50 has rear and intermediate seats 53 for lateral bosses or feet 54 at the lower portion of the injection unit A. Further attaching means includes at the inner or forward end of the table 50 a guide plate 55 having a longitudinal guide slot for reception of a slide block 56 secured to the conditioning cylinder 20, affording capacity for longitudinal adjustment of the latter. As fully disclosed in my parent application, the press unit B is equally adapted for other operative association with the injecting means, including positioning of the press for operation in the vertical plane, or endwise or "in-line" injection in the horizontal plane. In the latter instance the table 50 is demounted and the injection unit installed directly on the base C, in alignment with a bore 31a provided in the die plate 31 for receiving an elongated nozzle.

The molding press unit is supported at the material receiving and molding end with relation to a fixed part, as on the main frame C, herein by means of novel expansion bearing means indicated generally at 60, and seen on a larger scale in Fig. 1a. At its other end the press unit B is fixedly supported on the adjacent or underlying portion of the frame, such as the frame portion D in the Fig. 1 example, preferably by detachable anchor means as indicated at 70, the frame element D being removably attached to the frame or base as at 71.

Noting particularly Fig. 1a, said expansion bearing means 60 comprises a sleeve bearing 61 for each of one or more of the tie rods 32, in this instance the two rods adjacent the frame, one at each side of the press. Each such bearing element 61 has a base flange 62 adapted to seat on a boss or projection 63 formed on the main base C. Suitable cushioning means may be interposed between the flange 62 and boss 63 as at 64, these parts being anchored in position on the base C as by screws or bolts 65.

For cooperation with these sleeve bearings 61 the lower tie rods 32 have at the ends adjacent the injection unit A extended non-threaded bearing portions 32x slidably received and supported in the corresponding sleeve bearing 61. Thus these tie rods 32 are permitted to shift longitudinally relative to the described supporting means 60 at one end of the press unit B, while at their other or outer ends they are anchored in the end plate 30 and the latter in turn is securely held on the supporting frame D.

Under the high pressures at which molding presses of the type here concerned are generally operated, including pressures frequently ranging up to 25,000 to 30,000 lbs. per sq. in. and sometimes considerably higher, the heavy longitudinal tie rods such as 32 tends to elongate under the stretching force. While such elongation is not great as measured in terms of inches, probably not more than about 0.025 in. in a press of average size, it is sufficient to cause trouble, such as misaligning, warping, distortion or breakage of associated parts, in instances where as heretofore the tie rods have been rigidly anchored at their opposite ends. Since the bearing means as here illustrated and described provides for free longitudinal expansion, and subsequent contraction, of the tie rods, to the maximum extent necessary for any given installation, the objectionable results mentioned are avoided. It will be understood that the spacing between the bearing sleeves 61 and the threaded portions of the corresponding tie rods carrying the nuts 32a, is made greater than the maximum stretch or expansion calculated for the given press unit, so that no end thrust is at any time received by the sleeves or their supporting mounts.

Turning now more particularly to Figs. 2, 3 and 4, the toggle mechanism 40 of the molding press unit B comprises a system of linkage as seen in the closed die position in Fig. 2 and in open position in Fig. 3; see also Fig. 1.

As previously mentioned, the fixed outer end plate 30 has integrally formed at its inner face a pair of laterally spaced bosses or legs 42 extending in alignment with a pair of similar but herein somewhat shorter legs 41 at the inner face of the retractible die-holding plate 33. The die-operating plunger 43 has bearing support in the end plate 30, for actuation under the control of the hydraulic cylinder 44. At its inner end the plunger 43 has a detachable head 45 operatively associated with the toggle means.

The latter herein comprises opposed thrust links 46 at opposite sides of the plunger head and pivotally connected to it as by pivot posts 45a, 45a; Figs. 2 and 3. At their outer ends the thrust links 46 are pivotally received on connector pins 46a which also serve as the pivotal connection for the adjacent ends of the front and rear toggle members or links 47, 48. These in turn are mounted at their opposite ends on pivot pins 41a. 42a on the bosses 41, 42 of the movable and fixed plates 33, 30 respectively.

As evident in Figs. 2 and 3, the sets of three link elements 46, 47 and 48 are duplicated at opposite sides of the press unit, where they are oppositely disposed for general inward and rearward movement and the reverse. Also, by reference to Fig. 4 and Fig. 1, it is seen that multiple sets of these three link elements are provided, herein three of them, superposed in vertical line in the horizontal position of the press unit as in Fig. 1.

In accordance with the invention, the construction, proportioning and arrangement of the described linkage system and its relation to the plate elements of the press are such that in the full closed position of the movable die plate 33, Fig. 2, the main toggle members 47, 48 do not cross or reach an on-center position. That is, referring particularly to Fig. 2, the common pivot points 46a for the respective links 47 and 48 have a predeterminedly limited outward movement laterally, in which they approach but do not reach or cross the lines joining the opposite end pivot points 41a, 42a.

Accordingly the toggle system does not lock, in the sense of reaching or crossing dead center, before arriving in the full closed die position. Instead of such locking action as commonly heretofore provided for molding presses, the application of power as by means of the hydraulic cylinder 44 is so controlled, and is so overbalanced with reference to any injecting or other opposing pressure, that the movable die plate 33 is held forward in its full closed position under the continuing hydraulic or other pressure.

The press unit as a whole is organized and arranged for cooperation in this non-locking method of operation. The dies proper such as 36, 37 demountably associated with the fixed and movable die plates 31, 33 respectively are so far as practicable made of the same or substantially the same thickness, that is, the dimension in the direction of die closure. But since a great number of different dies may be installed, each with their multiple or other cavities specially hobbed or formed for the particular job, variations in die thickness are not infrequently encountered. This is almost inevitable where a given user of the molding apparatus obtains his dies from different makers.

Heretofore, in presses employing a locking toggle system, various adjustments have been necessary in order to take care of the variations in die thickness. Such adjustments have included for example various provisions for longitudinal shifting of the outer fixed end plate, corresponding to the element 30 hereof. Such adjustment is objectionable because of the opportunity for play between the parts and the likelihood of misalignment of the plate. Under the appropriate operating pressures even a slight misalignment or looseness as between the plate and tie rods, or the plate and its supporting means, is likely to result in imperfect work and in undue wear or damage to the press, as well as being dangerous to the operator.

By dispensing with locking of the toggle system, the present invention avoids any necessity for adjustment at the region referred to, while still accommodating variations in die thickness. This is taken care of by affording a correspondingly varied travel for the movable die plate 33, the toggle members 47, 48 merely being thrust outwardly to the appropriate less or greater degree as required to effect full closing of the particular dies. The described linkage system is constructed and arranged to afford a maximum forward or closing movement for the plate 33 calculated with reference to the greatest undersize likely to be encountered in any set of dies. Hence the toggle system does not lock even in extreme cases. Thus in effect the press and its toggle system are self-adjusting and flexibly accommodate themselves to any die variation, the dies being automatically held closed by the continued application of pressure upon the actuating plunger 43 throughout the entire period until ready for opening. This obviating of adjustment provisions applies also as to all operating connections between the plunger 43 and the movable plate 33, the various pressure-receiving or transmitting parts being firmly interconnected and secured, in the same relative positions, thus avoiding the difficulties generally attendant on adjustment of such parts in high-pressure molding apparatus.

The press as illustrated is equipped with knockout mechanism effective to dislodge or eject the molded articles in the known manner. Such mechanism conveniently is carried by a normally fixed but demountable frame indicated generally at 90. As best seen in Fig. 4, it herein comprises lateral arms 91, 92 formed with collars at their opposite ends as at 93, 94 adjustably received on the corresponding tie rods 32. The arms 91, 92 are connected by a crossmember 90a carrying one or more knockout pins 95 for projection through the movable die-holder plate 33 during retraction thereof, to discharge the molded article or articles from the open mold.

A controlled movement of the end die-holder plate 31, to disengage the injection nozzle 22 with respect to the adjacent die, was mentioned earlier herein. For such purposes said die-holder plate 31 is slidably disposed on the supporting tie rods 32. Outward movement of the plate is positively limited by the adjacent anchor units 32a providing abutment for it in the closed position of the mold. Upon opening of the mold, by retraction of the movable die holder 33 through the medium of the described toggle system, the end holder plate 31 initially moves back with the openable holder plate 33 for a slight distance, which need not be more than a fraction of an inch, the movement taking place under the influence of the frictionally interengaged parts of the separable dies, including the usual positioning pins and the like. Releasable means desirably is herein provided for limiting this movement.

For this purpose the plate 31 is formed with a lateral projection 96, Figs. 1 and 2, extending downward in the horizontal press position of said figures, and adapted for cooperation with a spring pressed plunger or pin 97 housed in a boss 98 fixed on the frame or base. This releasable pin 97 and the plate projection 96 are located and arranged to afford the desired spacing between them, lengthwise of the press, when the plate 31 is in its outermost or closed-mold position of Figs. 1 and 2. Occasionally it is desirable to shift the end holder plate 31 inward along the rods 32, as for example when installing different dies. To accomplish this it is necessary merely to withdraw the pin 97 from the path of the plate projection 96, whereupon the plate 31 may be manually or otherwise shifted along the tie rods 32. The inner end of the pin 97 and the adjacent side face of the plate projection 96 may be formed with cooperable bevelled portions whereby the plate may be returned to its normal outward position of Figs. 1 and 2, the spring pin 97 being automatically cammed out to permit the plate projection 96 to pass and then springing back to its normal plate-limiting position of Fig. 2.

My invention either as to method or apparatus is not limited to the particular steps or the embodiment of means for practicing the same as illustrated and described herein, and I set forth its scope in my following claim.

I claim:

1. In plastics molding apparatus, in combination, a supporting frame, a die press unit thereon comprising a fixed end plate, an opposite outer die-holder plate, a plurality of parallel tie rods extending through said plates and provided with means to hold them against outward movement, an inner die-holder plate reciprocably mounted on the tie rods for cooperation with the outer die-holder plate, pressure means for advancing and retracting said inner die-holder plate, certain of the tie rods being disposed adjacent the supporting frame and being anchored relative thereto at one of their ends, each of the last-named tie rods having a non-threaded end extension, and bearing sleeves anchored on said supporting frame and each movably receiving one of said extensions.

2. For plastics molding, a molding press comprising, in combination, a frame, a plurality of parallel connecting and guide rods, an end plate secured to the frame and to the rods at one end of the latter, an outer mold-holder plate on the other ends of the rods and held against movement thereon away from the end plate, an inner mold-holder plate movable on the rods toward and from the outer mold-holder plate for closing and opening mold elements carried thereby, pressure means for so moving the inner plate, one or more of the rods being extended outwardly beyond the outer plate to provide a guide bearing formation, and for each rod extension a bearing sleeve anchored on a stationary part of the frame and slidably receiving the bearing formation of the corresponding rod.

EDWARD R. KNOWLES.

REFERENCES CITED

The following references are of record in the file of this patent:

UNITED STATES PATENTS

| Number | Name | Date |
|---|---|---|
| 1,880,380 | Frantz | Oct. 4, 1932 |
| 2,094,080 | Parker | Sept. 28, 1937 |
| 2,107,190 | Shaw | Feb. 1, 1938 |
| 2,108,080 | Schultz et al. | Feb. 15, 1938 |
| 2,233,354 | Thilenius | Feb. 25, 1941 |
| 2,246,414 | McIntyre | June 17, 1941 |